(12) United States Patent
Kemnitzer et al.

(10) Patent No.: US 6,916,868 B2
(45) Date of Patent: Jul. 12, 2005

(54) SELECTIVE MODIFICATION OF PENDENT FUNCTIONALITIES OF POLYMERS

(75) Inventors: John Kemnitzer, San Diego, CA (US); George Brode, Bridgewater, NJ (US); Robert Minasyan, San Diego, CA (US); Timothy Malaney, Chula Vista, CA (US)

(73) Assignee: Integra LifeSciences Corporation, Plainsboro, NJ (US)

( * ) Notice: Subject to any disclaimer, the term of this patent is extended or adjusted under 35 U.S.C. 154(b) by 147 days.

(21) Appl. No.: 10/350,202

(22) Filed: Jan. 23, 2003

(65) Prior Publication Data

US 2004/0147688 A1 Jul. 29, 2004

(51) Int. Cl.$^7$ ................................. C08G 63/91
(52) U.S. Cl. .................. 524/113; 524/107; 524/366; 524/378; 524/538; 525/419
(58) Field of Search ................... 524/113, 107, 524/366, 378, 538; 525/419

(56) References Cited

U.S. PATENT DOCUMENTS

| | | |
|---|---|---|
| 4,286,083 A | 8/1981 | Kochanowski et al. |
| 4,558,101 A * | 12/1985 | Jachimowicz et al. ... 525/333.2 |
| 4,835,248 A | 5/1989 | Bader et al. |
| 4,980,449 A | 12/1990 | Kohn et al. |
| 5,043,203 A | 8/1991 | Fyvie et al. |
| 5,099,060 A | 3/1992 | Kohn et al. |
| 5,140,094 A | 8/1992 | Kohn et al. |
| 5,194,570 A | 3/1993 | Kohn et al. |
| 5,198,507 A | 3/1993 | Kohn et al. |
| 5,216,115 A | 6/1993 | Kohn et al. |
| 5,416,185 A | 5/1995 | Becraft et al. |
| 5,587,507 A | 12/1996 | Kohn et al. |
| 5,658,995 A | 8/1997 | Kohn et al. |
| 6,120,491 A | 9/2000 | Kohn et al. |
| 6,359,102 B1 | 3/2002 | Kemnitzer et al. |

FOREIGN PATENT DOCUMENTS

WO      WO 9630331      10/1996

OTHER PUBLICATIONS

Riffle et al., *Org. Coat. Plast. Chem.*, 42, 122–6 (1980).
Keohan et al., *J. Polym. Sci., Polym. Chem. Ed.*, 22(3), p. 679–704 (1984).

* cited by examiner

*Primary Examiner*—Ana Woodward
(74) *Attorney, Agent, or Firm*—Caesar, Rivise, Bernstein, Cohen & Pokotilow, Ltd.

(57) ABSTRACT

A process for selectively modifying pendent functionalities of a polymer containing the pendent functionalities and hydrolytically unstable backbone functionalities is provided. The process includes: (a) providing the polymer in a solvent system (preferably an ether-containing solvent system) adapted to maintain the polymer in a dissolved or partially dissolved state, wherein the pendent functionalities of the polymer are more accessible than the hydrolytically unstable backbone functionalities; and (b) adding at least one additive to the solvent system to selectively modify at least one of the pendent functionalities. The process is especially well suited for specifically acid hydrolyzing pendent esters of PDTE.

25 Claims, 3 Drawing Sheets

| A | B | C |
|---|---|---|
| PDTE:H2O:HCl / 1.00:1.05:0.31 | PDTE:H2O:HCl / 1.00:2.23:0.65 | PDTE:H2O:HCl / 1.00:3.19:0.93 |
| b[0]= 200.2771184578 | b[0]= 209.4741213994 | b[0]= 186.454243144 |
| b[1]= -3.5696231512 | b[1]= -2.8876717513 | b[1]= -6.3169314786 |
| $r^2$= 0.952020977 | $r^2$= 0.9381115031 | $r^2$= 0.8420648265 |

Fig. 5

| A | B | C |
|---|---|---|
| PDTE:H2O:HCl / 1.00:1.05:0.31 | PDTE:H2O:HCl / 1.00:2.23:0.65 | PDTE:H2O:HCl / 1.00:3.19:0.93 |
| b[0]= -8.5184852786 | b[0]= -2.8808566615 | b[0]= -0.3189375945 |
| b[1]= 5.6037364348 | b[1]= 1.1871626918 | b[1]= 0.446674236 |
| $r^2$= 0.9752627562 | $r^2$= 0.9635513773 | $r^2$= 0.977576293 |

SELECTIVE MODIFICATION OF PENDENT FUNCTIONALITIES OF POLYMERS

BACKGROUND OF THE INVENTION

1. Field of Invention

The invention relates to a process for selectively modifying pendent functionalities of polymers having hydrolytically unstable backbone functionalities and to products produced thereby.

2. Description of Related Art

It is frequently desirable to modify the properties of a polymer by modifying the pendent functionalities of the polymer. Such is the case for polymers having pendent protective groups remaining from polymerization. These relatively inert pendent groups can be necessary for polymerization, but undesirable in the product polymer itself.

For example, U.S. Pat. No. 6,120,491 reports that certain polycarbonates, polyarylates and poly(alkylene oxide) polymers based on amino acids, such as those disclosed in U.S. Pat. Nos. 5,099,060, 5,198,507, 5,216,115 and 5,658,995, cannot be prepared by conventional solution processes from monomers having free carboxylic acid groups. Removable protecting groups must be incorporated into the polymer that can be cleaved after the polymer is formed, without significant degradation of the polymer backbone. The protecting groups are needed to prevent cross-reaction of these otherwise free carboxylic acid groups with (i) phosgene, phosgene equivalents or diacid chlorides used in the preparation of polycarbonates and ester carbonate copolymers, and (ii) carbodiimide reagents used in the preparation of polyarylates.

The polymers with protected carboxylic acid groups are limited in specific bioresorption applications because of their slow rate of degradation and significant hydrophobicity. The free acid form of the polymers, in which the ester protecting groups have been removed from the pendent carboxylic acid chains of the diphenol based component, would be less hydrophobic and thus would be expected to exhibit somewhat increased degradation rates desirable in bioresorbable polymers.

In polycarbonates, polyarylates and poly(alkylene oxide) block copolymers thereof prepared from tyrosine-derived diphenol monomers, the backbone contains bonds that are designed to degrade in aqueous media (acidic, neutral, or basic). Thus, the selective removal of any carboxylic acid protecting groups is a challenge. According to the '491 patent, the ester protecting groups of such polymers cannot be removed by conventional hydrolysis techniques without unacceptable degradation of the polymer backbone.

The '491 patent purports to solve this problem in providing a process comprising controlling monomer feed ratios of desaminotyrosyl tyrosine ethyl ester (DTE) and desaminotyrosyl tyrosine benzyl ester (DTBn) monomers, followed by polymerization using phosgene or a phosgene equivalent. The desired copolymer is isolated, and subsequently subjected to hydrogenolysis to effect benzyl ester removal, yielding the free carboxylic acid copolymer for all compositions (e.g., the entire copolymer compositional range of the poly(DTE-co-X % DT) carbonates) (where DT is desaminotyrosyl tyrosine free acid) with controlled molecular weights. Although this synthetic strategy enables the preparation of the desired composition of matter, the economics of the process (viz., support of additional monomer manufacture, additional isolation/handling protocols, removal of catalyst residues, capital expenditure on pressure hydrogenation equipment, and increased waste streams) would jeopardize wide-use commercial acceptance.

Accordingly, it is desired to provide an alternative solution to the problem of selective modification of pendent groups in polymers with an acceptable low level of hydrolytically unstable backbone cleavage.

All references cited herein are incorporated herein by reference in their entireties.

BRIEF SUMMARY OF THE INVENTION

Accordingly, the invention provides a process for selectively modifying pendent functionalities of a polymer containing the pendent functionalities and hydrolytically unstable backbone functionalities, said process comprising: (a) providing the polymer in a solvent system adapted to maintain the polymer in a dissolved or partially dissolved state wherein the pendent functionalities of the polymer are more accessible than the hydrolytically unstable backbone functionalities of the polymer; and (b) adding at least one additive to the solvent system to selectively modify at least one of the pendent functionalities.

Also provided are polymers produced by the process.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention provides an alternative means for selective modification of pendent groups on polymers having hydrolytically unstable backbones. Contrary to the teachings of the '491 patent, the invention provides for acid hydrolysis of such polymers without unacceptable amounts of backbone degradation. Base hydrolysis will also effect pendent ester removal, but is most typically accompanied with severe backbone hydrolysis. Consequently, acid hydrolysis is preferred. In preferred embodiments, the invention surprisingly mitigates the expected shortcomings of acid hydrolysis through the use of an ether containing solvent system. Moreover, the invention is simpler and more economical than the benzyl ester hydrogenolysis method of the '491 patent.

The solvent systems of the invention can include one or more solvents. Each solvent in the system need not constitute an ether-type solvent only. Other types of solvent, such as those discussed below, are also suitable for use in the invention.

Although the invention is preferably applied to polymers intended for use in bioresorbable materials, and particularly to polycarbonate, polyester or polyamide polymers produced by the biphasic polymerization process disclosed in our U.S. Pat. No. 6,359,102, the invention is also suitable for modifying other types of polymers having hydrolytically unstable backbones and pendent groups. Thus, while the following examples focus on PDTE as the polymer, the invention is not limited thereto.

PDTE is the most preferred polymer to modify by the process of the invention because of its superior properties as a bioresorbable material. Other types of bioresorbable materials, such as other polymers based on lactic acid, glycolic acid, orthoester, etc., are inherently hydrophobic (water insoluble), have marginal mechanical properties, and on bioresorption (through enzymatic and/or chemical hydrolysis) release the starting acid (i.e., acid dumping), which frequently leads to inflammation and swelling (e.g., in orthopedic applications). In addition, there is the complete absence of functional groups for derivatization in many bioresorbable materials. Table 1 shows the acid equivalent ratio available upon complete hydrolysis from a few of the most commonly utilized degradables, including PDTE.

copolymer compositional range of the poly(DTE-co-X % DT carbonates) through preferential and controlled hydrolysis of the pendent ester group to form pendent carboxylic acid groups, without undue cleavage of the amide or carbonate functions in the parent PDTE by selection of appropriate parameters as given by the invention.

A preferred solvent system can also be provided in the form of a mixture of water and a polymer-dissolving water-miscible ether (typically a cyclic ether), wherein the water-miscible ethers are preferably 1,4-dioxane and tetrahydrofuran.

Additionally, use of an additional polymer solvent, such as methylene chloride, chloroform, and the like, can be provided in conjunction with the ether-containing solvent.

The solvent system can then be provided in a composition containing the polymer to be modified as a solution in an organic solvent and secondarily providing the ether-containing solvent or the polymer to be modified can be added to the solvent system in conjunction with the ether-containing solvent. An advantage of the former alternative is that the pendent group modification process can be appended to a polymerization process without the need for complete isolation of the polymer from the product mixture yielded by polymerization. It is possible to simply adjust the

TABLE 1

Acid byproduct released from commonly used degradable polymers.

| Polymer Type | Formulation | Acid | m. eq. of effective $H^{\oplus}$ in 10 g Device | Inflammatory Response |
|---|---|---|---|---|
| Polyglycolic Acid | $\mathrm{-[CH_2CO_2]-}$ 58 | $HOCH_2CO_2H$ 76 | 172 | High |
| Polylactic Acid | $\mathrm{-[CH(CH_3)CO_2]-}$ 72 | $HOCH(CH_3)CO_2H$ 90 | 139 | High |
| Tyrosine Polycarbonate | PDTE 383 | $HOC_6H_4CH_2CH_2CO_2H$ 166 + $HOC_6H_4CH_2CH(NH_2)CO_2H$ 181 | 26* | Low |

*26 m. eq. $H^{\oplus}$ in 10 g Device effective since the carboxylic acid in tyrosine is buffered by the free amine.

The copolymer is composed of DTE and DT monomeric repeat units, as shown in the following structure:

solvent properties of the product mixture (or a fraction therefrom) to achieve the desired solvent system and then DTE monomeric repeat unit      DT monomeric repeat unit Controlling the ratio and/or placement of DTE and DT throughout the copolymer allows an altering of the final properties, such as hydrophilic character, degradation rates, mechanical strength retention and ability to derivatize through the pendent free carboxylic acid.

Accordingly, a particularly preferred embodiment of the invention provides a process for synthesizing the entire acidify the product mixture/fraction to hydrolyze the pendent functionalities. Thus, in a particularly preferred embodiment of the invention, the product mixture from the biphasic polymerization, described in above-identified U.S. Pat. No. 6,359,102, is phased to obtain the organic phase, which will contain PDTE or some other polymer, at least one solvent is added to the organic phase to provide the desired solvent system, and the system is then acidified to acid hydrolyze pendent ester groups from the polymer. There is no need to isolate the polymer twice, thereby cutting precipitation solvent and handling time by over 50%, while at the same time being able to access the desired copolymer compositional range.

TABLE 2

Figure 2:
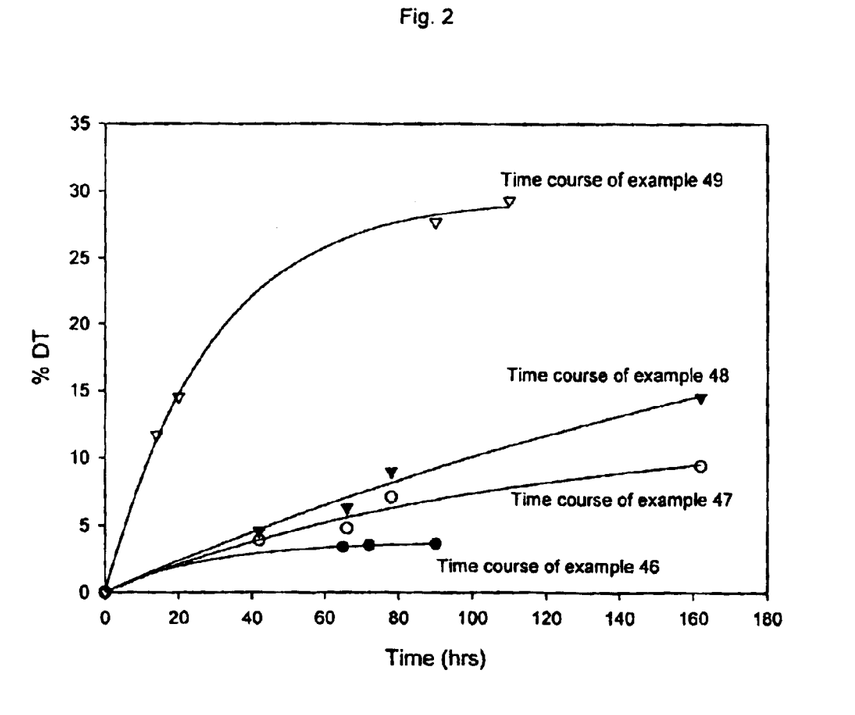
FIG. 2 is a plot of time vs. % DT for mixed solvent systems, as per Examples 46–49.
Figure 3:
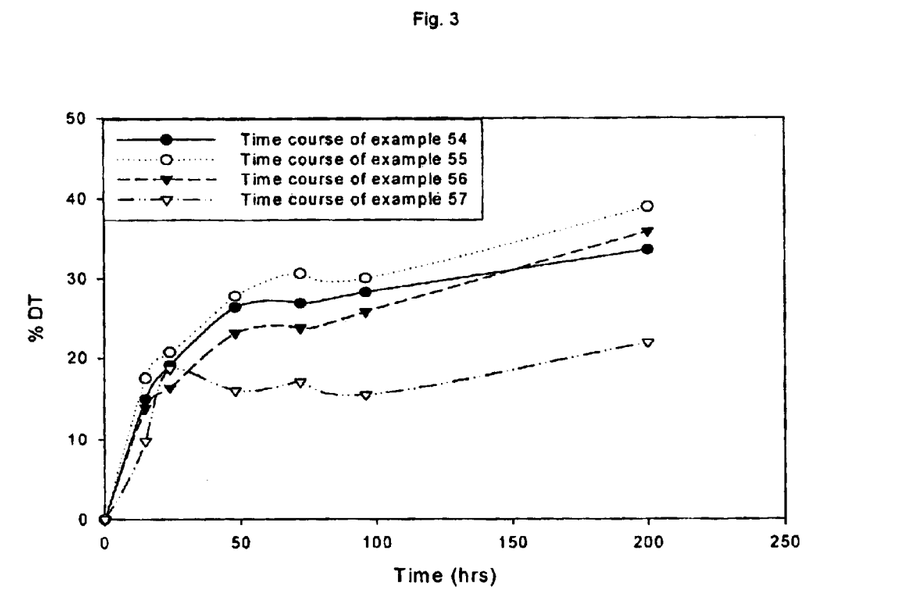
FIG. 3 is a plot of time vs. % DT for mixed solvent systems, as per Examples 54–57.

Time course of Example 49: DT Copolymer via acid hydrolysis route using polymer dissolved in $MeCl_2$, followed by addition of THF and aqueous HCl (FIG. 2).

| Time (hrs) | % DT | Mw (×10³) |
|---|---|---|
| 0 | 0 | 192.5 |
| 14 | 11.7 | 148.0 |
| 20 | 14.5 | 141.5 |
| 90 | 27.6 | 120.4 |
| 110 | 29.3 | 124.8 |

TABLE 3

Poly(DTE-co-X % DT carbonate) via the acid hydrolysis route, using a 1,4-dioxane/water system.

| % DT Target | Actual % DT | Predicted $M_w$ | Actual $M_w$ | Yield |
|---|---|---|---|---|
| 5%[a] | 4.9 | 174K | 172K | 83% |
| 5%[a] | 5.6 | 77K | 89K | 65% |
| 25%[b] | 24.0 | 130K | 131K | 88% |
| 25%[a] | 23.6 | 106K | 118K | 94% |

[a]PDTE:$H_2O$:HCl/1.00:1.05:0.31
[b]PDTE:$H_2O$:HCl/1.00:2.23:0.65

Figure 1:
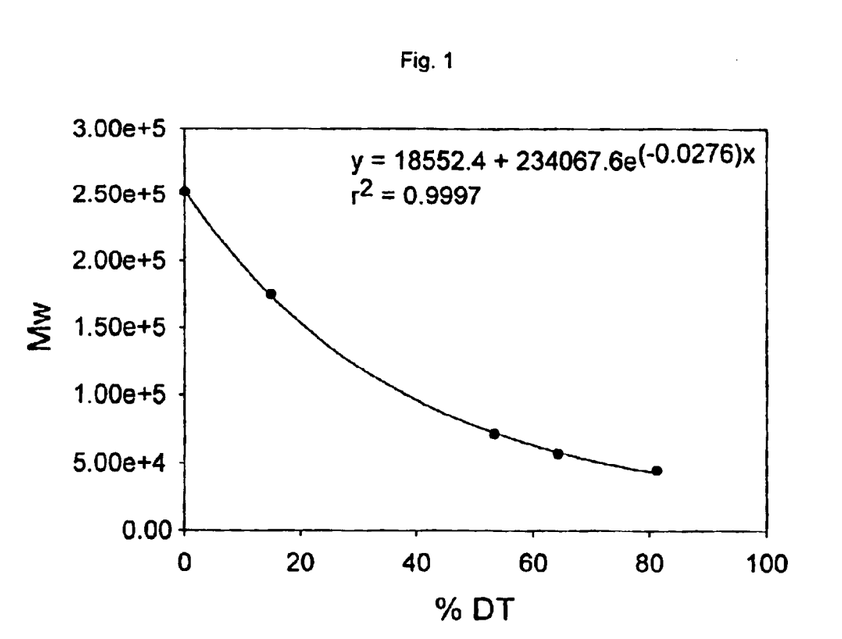
FIG. 1 is a plot of Mw vs. % DT for a 1,4-dioxane (1,4-DO)/HCl/$H_2O$ system in accordance with the invention.

Higher % DT compositions may be obtained by control of appropriate solvent parameters (FIG. 1).

Figure 4:
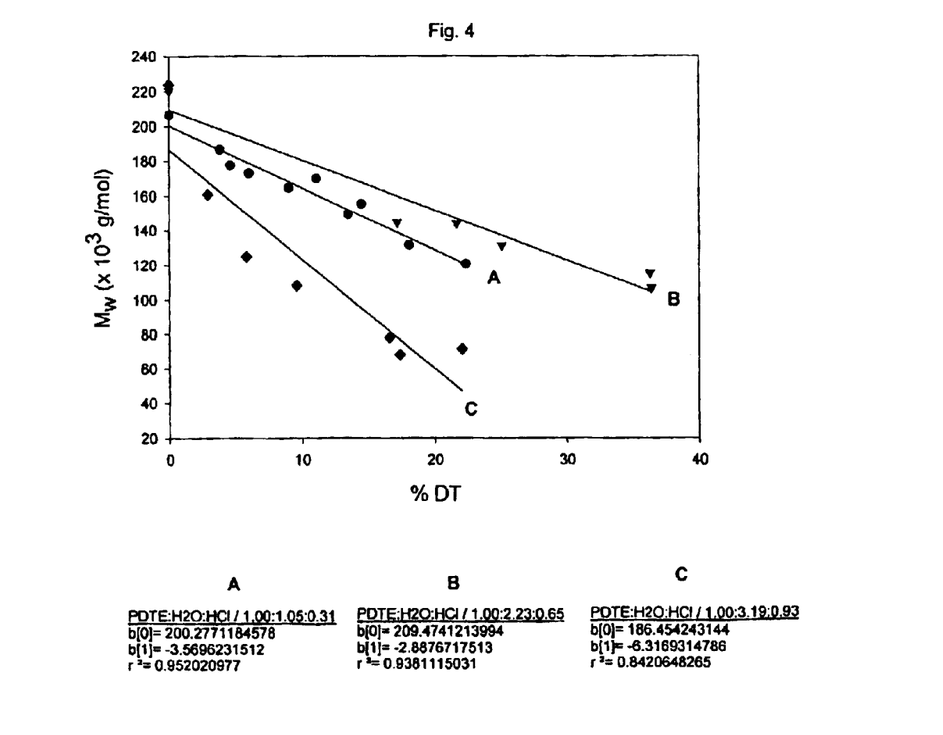
FIG. 4 is a plot showing the effect of increasing HCl and $H_2O$ concentrations for PDTE in 1,4-DO on Mw vs. % DT, in accordance with the invention.

Acidification of this solvent system can be achieved by the addition of an acid in an amount and concentration sufficient to achieve a pH of less than 7, preferably less than 5, more preferably less than 3, most preferably about 2. Suitable acids for use in the invention include, but are not limited to, inorganic acids such as hydrochloric acid, and organic acids such as p-toluenesulfonic acid. FIG. 4 graphically demonstrates the effect of varying the acid hydrolysis conditions on the relationship between % DT and Mw.

Figure 5:
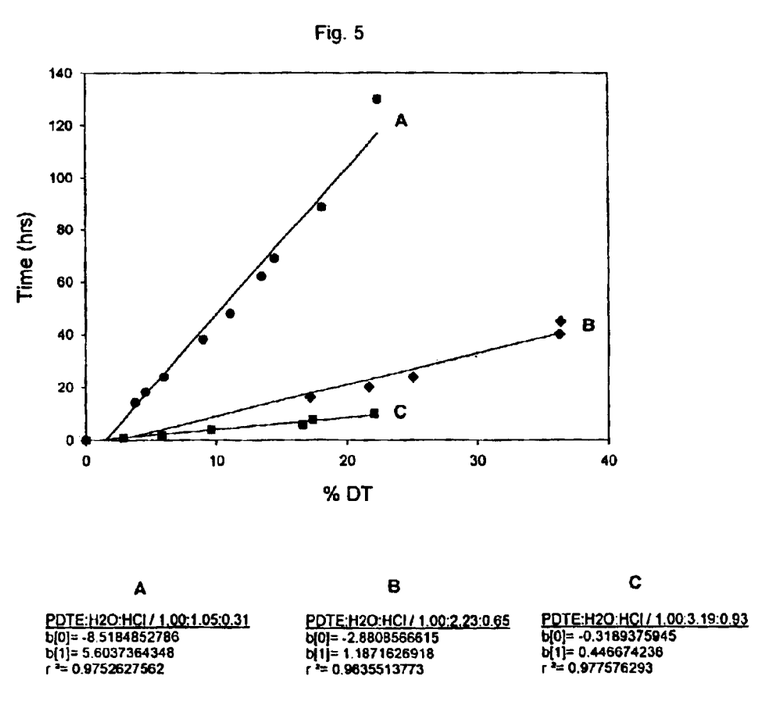
FIG. 5 is a plot showing the effect of increasing HCl and $H_2O$ concentrations for PDTE in 1,4-DO on the rate of conversion to DT, in accordance with the invention.

Since the number of pendent esters acid hydrolyzed to form pendent carboxylic acids increases as a function of the reaction time of the acid hydrolysis, and the molecular weight of the polymer decreases as a different function of the reaction time, the characteristics of the resulting polymer can be adjusted by adjusting the reaction time. A calibration curve, such as shown in FIG. 5 can be plotted for a given system to assist in such adjustments.

Polymers produced by the process of the invention can be distinguished from polymers produced by other processes. For example, polymers produced by a hydrogenolysis process contain undesirable contaminants from the hydrogenolysis process, such as unremoved benzyl esters and residual metal catalyst. The present process is much cleaner, and yields an extremely high purity polymer product substantially free (containing less than 10 wt. %, more preferably less than 1 wt. %, even more preferably less than 0.1 wt. %) of such contaminants.

The invention will be illustrated in more detail with reference to the following Examples, but it should be understood that the present invention is not deemed to be limited thereto.

EXAMPLES

Example 1

A 100 mL flask was charged with 0.75 g of PDTE having a starting weight average molecular weight of 107,000 g/mol. The PDTE was dissolved in 7.5 mL of methylene chloride and cooled to 0° C. 2 mL of 1.0 N sodium hydroxide were then added. The reaction mixture was stirred vigorously for 3.5 hours, after which time it was acidified to pH 2 and diluted with an additional 10 mL of methylene chloride. The system was then extracted with 10 mL of saturated sodium chloride. The resulting polymer was isolated by precipitation into 150 mL of diethyl ether, followed by drying under vacuum. The resulting isolated powder had a Mw of 91,000 g/mol and a DT % (DT/(DTE+DT)) of 4%.

The % DT was determined by a copolymer assay method specifically developed for the analysis of DT and DTE content for any given member of the poly(DTE-co-X % DT carbonate) family. The developed HPLC method allows determination of the monomeric composition (i.e., DT and DTE) of the copolymers. Additionally, the operational mode of the assay can be expanded to allow determination of various other byproducts that may be potentially formed by thermolysis. This enables quickly, reproducibly, and economically assaying copolymer composition across the complete compositional range (FIG. 5).

The assay method involves the following:
a) Mild digestion of Poly(DTE-co-X % DT carbonate), resulting in carbonate backbone cleavage only;
b) 3 mg sample, 1 mL 100 mmol $NH_4OH$ (80:20/1,4-DO:$H_2O$), 2–4 hr @ 60° C.;
c) HPLC analysis utilizing a reverse phase column (C18);
d) Linear gradient of $CH_3CN/H_2O$ 95/5 to 50/50 (45 min) @ 1 mL/min; and
e) λ280 detection.

Example 2

A 100 mL flask was charged with 0.75 g of PDTE having a starting weight average molecular weight of 107,000 g/mol. The PDTE was dissolved in 7.5 mL of methylene chloride and cooled to 0° C. 2 mL of 1.0 N sodium hydroxide were then added. The reaction mixture was stirred vigorously for 13 hours, after which time it was acidified to pH 2 and diluted with an additional 10 mL of methylene chloride. The system was then extracted with 10 mL of saturated sodium chloride, followed by two washings with 10 mL of water. The organic solution was dried using anhydrous sodium sulfate, filtered, and the polymer isolated by solvent removal under reduced pressure, followed by further drying under vacuum. The resulting isolated powder had a Mw of 114,000 g/mol and % DT of 1%.

Example 3

A 100 mL flask was charged with 0.50 g of PDTE having a starting weight average molecular weight of 107,000 g/mol. The PDTE was dissolved in 7.5 mL of methylene chloride. 15 mg of benzyltriethylammonium chloride were added to the flask, followed by 1.25 mL of 1.0 N sodium hydroxide. The reaction mixture was stirred vigorously for 118 hours at ambient temperature, after which time an additional 10 mL of methylene chloride were added to it. The reaction mixture was then acidified to pH 2. The system was extracted with 10 mL of saturated sodium chloride, followed by two washings with 10 mL of water. The resulting polymer was isolated by precipitation into 150 mL of diethyl ether, followed by drying under vacuum. The resulting isolated powder had a Mw of 13,000 g/mol and % DT of 14%.

Example 4

A 25 mL flask was charged with 0.50 g of PDTE having a starting weight average molecular weight of 174,000 g/mol. The PDTE was dissolved in 5.0 mL of tetrahydrofuran. 1.0 mL of 1.0 N sodium hydroxide was added to the flask, followed by vigorous stirring for 30 minutes. The reaction mixture was phased and the solvent was removed under reduced pressure, followed by further drying under vacuum. The resulting isolated powder had a Mw of 6,000 g/mol and % DT of 1%.

Example 5

A 25 mL flask was charged with 0.30 g of PDTE having a starting weight average molecular weight of 174,000 g/mol. The PDTE was dissolved in 3.0 mL of tetrahydrofuran. Six drops of 12M hydrochloric acid were added to the flask, followed by vigorous stirring for 114 hours. The resulting polymer was isolated by precipitation into 50 mL of diethyl ether, followed by drying under vacuum. The resulting polymer had a Mw of 15,000 g/mol and % DT of 69%.

Example 6

A 25 mL flask was charged with 1.00 g of PDTE having a starting weight average molecular weight of 70,000 g/mol. The PDTE was dissolved in 10 mL of tetrahydrofuran. 5 mL of 1.5M hydrochloric acid were added to the flask, followed by vigorous stirring for 3 hours. The resulting polymer was isolated by precipitation into 100 mL of the precipitation medium (water), rinsed with additional amounts of the precipitation medium until the washings were neutral, and then dried under vacuum. The resulting polymer had a Mw of 73,000 g/mol and % DT of 2%.

Examples 7–27

Examples 7–27 were performed in accordance with Example 6, and are summarized in Table 4, below:

TABLE 4

Examples 7–27.

| Example No. | Amount PDTE (g) | Starting MW PDTE (g/mol × 1000) | Solvent (mL) | Acid (mL) | Stirring Time (Hr) | Precipitation Medium (mL) | MW Product (g/mol × 1000) | % DT | % yield |
|---|---|---|---|---|---|---|---|---|---|
| 7 | 1.00 | 62 | THF (10) | 12 M HCl (1) | 1 | DE (125) | 46 | 16 | 93 |
| 8 | 1.00 | 62 | THF (5) | 12 M HCl (1) | 2 | Water (200) | 43 | 26 | 91 |
| 9 | 1.00 | 62 | THF (5) | 12 M HCl (1) | 4 | Water (200) | 31 | 41 | 95 |
| 10 | 1.00 | 62 | THF (5) | 12 M HCl (1) and Water (0.5) | 4 | Water (200) | 40 | 29 | 100 |
| 11 | 1.00 | 62 | THF (5) | 12 M HCl (1) and Water (0.5) | 6 | Water (200) | 33 | 44 | 96 |
| 12 | 1.00 | 62 | THF (5) | 12 M HCl (1) and Water (0.5) | 8 | Water (200) | 30 | 54 | 95 |
| 13 | 1.00 | 62 | THF (5) | 12 M HCl (1) and Water (1) | 4 | Water (200) | 51 | 10 | 99 |
| 14 | 1.00 | 62 | THF (5) | 12 M HCl (1) and Water (1) | 6 | Water (200) | 47 | 20 | 94 |
| 15 | 1.00 | 62 | THF (5) | 12 M HCl (1) and Water (1) | 8 | Water (200) | 44 | 26 | 94 |
| 16 | 1.00 | 62 | THF (5) | 12 M HCl (0.5) and Water (1) | 17 | Water (200) | 42 | 22 | 90 |
| 17 | 1.00 | 62 | THF (5) | 12 M HCl (0.25) and Water (1.25) | 17 | Water (200) | 55 | 8 | 94 |
| 18 | 1.00 | 62 | THF (5) | 12 M HCl (0.10) and Water (1.40) | 17 | Water (200) | 60 | 6 | 94 |
| 19 | 5.00 | 62 | THF (25) | 12 M HCl (7.5) | 3.5 | Water (1000) | 32 | 52 | 92 |
| 20 | 3.00 | 354 | THF (35) | 12 M HCl (10.5) | 3.5 | Water (1000) | 60 | 50 | 79 |
| 21 | 1.00 | 224 | DO (10) | 12 M HCl (0.2) | *** | *** | *** | *** | *** |
| 22a | 150 | 198 | DO (1500) | 12 M HCl (9.9) | 19 | 2 P* | 172 | 5 | 83 |
| 22b | 150 | 198 | DO (1500) | 12 M HCl (9.9) | 111 | 2 P* | 118 | 24 | 94 |
| 23 | 80 | 89 | DO (800) | 12 M HCl (5.3) | 24 | 2 P* | 89 | 6 | 65 |
| 24 | 80 | 232 | DO (800) | 12 M HCl (10.6) | 33 | 2 P* | 131 | 24 | 88 |
| 25 | 20 | ? | DO (200) | 12 M HCl (2.7) | 30 | 2 P* | 105 | 23 | 94 |
| 26a | 582 | 248 | DO (5000) | 12 M HCl (38.6) | 23 | 2 P** | 205 | 9 | 94 |
| 26b | 582 | 248 | DO (5000) | 12 M HCl (38.6) | 32 | 2 P** | 192 | 11 | 88 |
| 27a | 600 | 277 | DO (6000) | 12 M HCl (79.5) | 28 | 2 P** | 158 | 23 | 72 |
| 27b | 600 | 277 | DO (6000) | 12 M HCl (79.5) | 48 | 2 P** | 132 | 31 | 86 |

Abbreviations: Tetrahydrofuran (THF), Diethyl ether (DE), 12 molar Hydrochloric acid (12 M HCl), 1,4-Dioxane (DO), and 2-Propanol (2 P). Note: 12 M HCl is a 37 weight percent solution of HCl in water.
*Vacuum drying conducted at 75° C.
**Vacuum drying conducted at 105° C.
***Time course evaluation, graphically depicted in FIG 1.

Example 28

A 50 mL flask was charged with 1.0 g of PDTE with a starting weight average molecular weight of 252,000 g/mol. The PDTE was dissolved in 15 mL of 1,4-dioxane, and then 0.58 g of p-toluenesulfonic acid monohydrate was added and stirred until dissolved. Water (0.50 mL) was slowly added via pipet to give a clear and colorless reaction solution. The solution was stirred vigorously for 45 hours. The resulting polymer was isolated by precipitation into 2-propanol, rinsed with 2-propanol, and dried under vacuum at 65° C. The resulting polymer had a Mw of 109,000 g/mol, % DT of 31%, and an overall isolated yield of 86%.

Examples 29–38

Examples 29–37 were performed in 25 mL flasks in accordance with Example 28 (as was Example 38 in a larger flask), and are summarized in Table 5.

Examples 39–42

Each of four 25 mL round-bottom flasks containing a magnet was charged with about 1.0 g of poly(DTE carbonate), which was dissolved in 10 mL of 1,4-dioxane. Glacial acetic acid and DI water were then added via syringe or graduated pipet as appropriate in specified amounts. The mixture was then stirred at RT for about 24 hours. The product was isolated by precipitation into 2-propanol, followed by 2-propanol rinsing and vacuum drying at 85° C. for about 24 hrs. Prescribed ratios and results are summarized in Table 5.

Examples 43–45

Each of three 25 mL round-bottom flasks containing a magnet was charged with about 1.0 g of poly(DTE carbonate), which was dissolved in 10 mL of the solvent listed below. A prescribed amount of 37% HCl (12M HCl) was then added via graduated pipet, and then stirred at RT for about 22 hours. The product was isolated by precipitation into 2-propanol, followed by 2-propanol rinsing and vacuum drying at 85° C. for about 24 hrs. Prescribed ratios and results are summarized in Table 5.

Example 46

About 1.0 g of poly(DTE carbonate) was charged to a 25 mL round-bottom flask containing a stir bar, and dissolved by the addition of 15 mL of methylene dichloride. 0.20 mL of 37% HCl (12M HCl) was added via pipet, and then stirred at RT for 90 hours. The product was isolated by precipitation into 2-propanol and vacuum dried at 85° C. for about 18 hrs.

Examples 47–49

To a 25 mL round-bottom flask with stir bar charged ~1.0 g of poly(DTE carbonate) (PDTE), and dissolved by the addition of 15 mL of methylene dichloride. Added via pipet a prescribed volume of 1,4-DO or THF, followed by 0.15 mL of 37% HCl (12M HCl). Let stir at RT for 78–90 hours. Isolation by precipitation into 2-propanol. Prescribed ratios and results summarized in Table 5.

Examples 50–53

To each of 5×25 mL round-bottom flasks with stir bar charged ~1.0 g of poly(DTE carbonate) (PDTE), 0.5 g (or 0.5 mL) of the prescribed poly(ethylene glycol) dimethyl ether or tert-butyl methyl ether, and dissolved each by the addition of 15 mL of methylene dichloride. Added via pipet 0.20 mL of 37% HCl (12M HCl). Let stir at RT for ~70 hours. Isolation by precipitation into 2-propanol, followed by washing with water, and completed with 2-propanol rinsing. Vacuum drying at 85° C. for ~18 hrs. Prescribed ratios and results summarized in Table 5.

Examples 54–57

To each of 4×50 mL round-bottom flasks with stir bar charged 20 mL of 6% poly(DTE carbonate) solution in methylene dichloride from the polymer manufacturing process, as disclosed in the aforementioned reference U.S. Pat. No. 6,359,102, prior to isolation. Added via graduated pipet 1.5 mL of either 1,4-dioxane, tetrahydrofuran or PEG 500, followed by 0.15 mL of 37% HCl. Let stir at room temperature followed by periodic 3 mL aliquot removal, isolation by precipitation into 2-propanol, and subsequent analyses for % DT and molecular weight.

TABLE 5

Examples 28–57.

| Example No. | Amount PDTE (g) | Starting MW PDTE (g/mol × 1000) | Solvent (mL) | Acid (amount) and Any Additional Solvent | Stirring Time (Hr) | Precipitation Medium (mL) | MW Product (g/mol × 1000) | % DT | % Yield |
|---|---|---|---|---|---|---|---|---|---|
| 28[D] | 1.0 | 252 | DO (15) | PTSAM (0.58 g) and water (0.50 mL) | 45 | 2 P | 109 | 31 | 86 |
| 29[D] | 1.00 | 252 | DO (15) | PTSAM (0.10 g) and water (0.50 mL) | 45 | 2 P | 198 | 9 | 92 |
| 30[D] | 1.00 | 252 | DO (15) | PTSAM (0.50 g) | 45 | 2 P | 154 | 23 | 87 |
| 31[C] | 1.00 | 252 | NMP (15) | PTSAM (0.11 g) and water (0.50 mL) | 45 | 2 P | 218 | 0.9 | 92 |
| 32[C] | 1.00 | 252 | NMP (15) | PTSAM (0.50 g) | 45 | 2 P | 226 | 1.4 | 91 |
| 33[C] | 1.00 | 252 | NMP (15) | PTSAM (0.50 g) | 45 | 2 P | 194 | 1.8 | 89 |
| 34 | 1.00 | 252 | DO (15) | 4 M HCl in DO (0.33 mL) (no water added) | 14 | Water (200) | 255 | 1.1 | 96 |
| 35 | 1.00 | 252 | DO (14) | 4 M HCl in DO (0.66 mL) (no water added) | 14 | Water (200) | 241 | 1.9 | 94 |
| 36 | 1.00 | 252 | DO (13) | 4 M HCl in DO (2 mL) (no water added) | 14 | Water (200) | 181 | 5.1 | 99 |
| 37 | 1.00 | 252 | DO (10) | 4 M HCl in DO (5 mL) (no water added) | 14 | Water (200) | 185 | 4.8 | 98 |
| 38 | 20.0 | 268 | DO (250) | 12 M HCl (8 mL) | 20 | 2 P | 68 | 55.5 | 74 |
| 39[D] | 1.00 | 175 | DO (10) | GAA (0.07) and Water (0.08) | 24 | 2 P | 168 | 0.3 | 94 |
| 40[D] | 1.00 | 175 | DO (10) | GAA (0.21) and Water (0.23) | 24 | 2 P | 168 | 0.2 | 94 |
| 41[D] | 1.00 | 175 | DO (10) | GAA (0.35) and Water (0.38) | 24 | 2 P | 166 | 0.3 | 92 |

TABLE 5-continued

Examples 28–57.

| Example No. | Amount PDTE (g) | Starting MW PDTE (g/mol × 1000) | Solvent (mL) | Acid (amount) and Any Additional Solvent | Stirring Time (Hr) | Precipitation Medium (mL) | MW Product (g/mol × 1000) | % DT | % Yield |
|---|---|---|---|---|---|---|---|---|---|
| 42[D] | 1.00 | 175 | DO (10) | GAA (1.39) and Water (1.51) | 24 | 2 P | 155 | 0.3 | 93 |
| 43[C] | 1.00 | 175 | DMF (10) | 12 M HCl (1) and water (0.30) | 22 | 2 P | 148 | 3 | 89 |
| 44[C] | 1.00 | 175 | DMA (10) | 12 M HCl (1) and water (0.30) | 22 | 2 P | 161 | 1 | 95 |
| 45[C] | 1.00 | 175 | NMP (10) | 12 M HCl (1) and water (0.30) | 22 | 2 P | 113 | 2 | 91 |
| 46[E] | 1.00 | 168 | MeCl$_2$ (15) | 12 M HCl (0.20) | 90 | 2 P | 153 | 4 | 89 |
| 47 | 1.00 | 193 | MeCl$_2$ (15) + DO (0.5) | 12 M HCl (0.15) | 78 | 2 P | 180 | 7 | ND |
| 48 | 1.00 | 193 | MeCl$_2$ (15) + DO (1) | 12 M HCl (0.15) | 78 | 2 P | 176 | 9 | ND |
| 49 | 1.00 | 193 | MeCl$_2$ (15) + THF (3.5) | 12 M HCl (0.15) | 90 | 2 P | 120 | 28 | ND |
| 50[F] | 1.00 | 168 | MeCl$_2$ (15) + PEG A (0.5) | 12 M HCl (0.20) | 70 | 2 P | 133 | 10.4 | 92 |
| 51[F] | 1.00 | 168 | MeCl$_2$ (15) + PEG B (0.5) | 12 M HCl (0.20) | 70 | 2 P | 141 | 8.5 | 93 |
| 52[F] | 1.00 | 168 | MeCl$_2$ (15) + PEG C (0.5) | 12 M HCl (0.20) | 70 | 2 P | 145 | 9.6 | 95 |
| 53[F] | 1.00 | 168 | MeCl$_2$ (15) + MTBE (0.5) | 12 M HCl (0.20) | 70 | 2 P | 135 | 5.5 | 93 |
| 54 | 1.2 | 174 | MeCl$_2$ (18.8) + DO (1.5) | 12 M HCl (0.15) | 96 | 2 P | 94 | 28 | 75 |
| 55 | 1.2 | 174 | MeCl$_2$ (18.8) + THF (1.5) | 12 M HCl (0.15) | 96 | 2 P | 89 | 30 | 70 |
| 56 | 1.2 | 174 | MeCl$_2$ (18.8) + PEG 500 (1.5) | 12 M HCl (0.15) | 96 | 2 P | 97 | 26 | 74 |
| 57 | 1.2 | 174 | MeCl$_2$ (18.8) | 12 M HCl (0.15) | 96 | 2 P | 102 | 15 | 88 |

Notes for Table 5
1. Additional Abbreviations used include: 1-methyl-2-pyrrolidinone (a.k.a. N-methylpyrrolidinone or NMP), p-toluenesulfonic acid monohydrate (PTSAM), glacial acetic acid (GAA), N,N'-dimethylformamide (DMF), N,N'-dimethylacetamide (DMA), dichloromethane (a.k.a. methylene chloride or MeCl$_2$), tert-butyl methyl ether (MTBE), poly(ethylene glycol) dimethyl ether of molecular weights 500 (PEG A), 1000 (PEG B), and 2000 (PEG C), and not determined (ND).
2. C superscript denotes examples for non-ether containing solvent systems.
3. D superscript denotes examples for cyclic ether containing solvent systems with acids other than HCl.
4. E superscript denotes example without an ether.
5. F superscript denotes examples for linear ether containing systems.

Use of certain non-ether containing systems: (a) does not generally result in appreciable pendent ester cleavage; (b) does generally result in varying undesired degrees of backbone cleavage; and (c) does not facilitate desired reproducible control of ester cleavage. Additionally, other non-ether containing examples are worse for obtaining % DT at desired levels (viz., lower by a factor of 10x) by using acids of low pKa in ether containing systems.

It is apparent from the foregoing description that the inventors have provided for pendent ester removal at controlled levels (determined via HPLC) with random backbone distribution (determined via $^{13}$C NMR) from the parent PDTE, via a preferred acid hydrolysis process. The process has been demonstrated to be reproducible and predictable for % DT and Mw using starting PDTE at various molecular weights;
fully scaleable; and
optimized for selected solvent conditions.

Such results were certainly unpredictable in view of the aforementioned teaching away from acid hydrolysis by the '491 patent.

While the invention has been described in detail and with reference to specific examples thereof, it will be apparent to one skilled in the art that various changes and modifications can be made therein without departing from the spirit and scope thereof.

What is claimed is:

1. A process for selectively hydrolyzing at least one pendent ester of a polymer, said process comprising:
   providing the polymer in a solvent system adapted to maintain the polymer in a dissolved or partially dissolved state such that the at least one pendent ester is hydrolyzed more readily than backbone functionalities of the polymer, wherein the polymer comprises at least one member selected from the group consisting of a polycarbonate, a polyester, a polyarylates, and a polyamide; and
   adding at least one acid to the solvent system to selectively hydrolyze the at least one pendent ester.

2. The process of claim 1, wherein the solvent system is an ether containing solvent system for the polymer.

3. The process of claim 1, wherein the acid is hydrochloric acid.

4. The process of claim 1, wherein the acid is p-toluenesulfonic acid.

5. The process of claim 1, wherein the solvent system comprises at least one solvent selected from the group consisting of 1,4-dioxane, tetrahydrofuran, dichloromethane, tert-butyl methyl ether and poly(ethylene glycol) dimethyl ether.

6. The process of claim 1, wherein the solvent system consists essentially of water and a water-miscible ether.

7. The process of claim 6, wherein the water-miscible ether is cyclic.

8. The process of claim 7, wherein the water-miscible ether is 1,4-dioxane.

9. The process of claim 7, wherein the water-miscible ether is tetrahydrofuran.

10. The process of claim 6, wherein the water-miscible ether is non-cyclic.

11. The process of claim 10, wherein the water-miscible ether is poly(ethylene glycol).

12. The process of claim 1, wherein the polymer is amino acid derived.

13. The process of claim 12, wherein the solvent system is an ether-containing solvent system for the polymer.

14. The process of claim 12, wherein the polymer is poly(desaminotyrosyl-tyrosine (ethyl ester) carbonate) (PDTE).

15. The process of claim 14, wherein the solvent system is an ether-containing solvent system for PDTE.

16. The process of claim 14, wherein the number of the pendent esters acid hydrolyzed to form at least one pendent carboxylic acid functionality increases as a first function of a reaction time of the acid hydrolysis, and the molecular weight of the polymer decreases as a second function of the reaction time.

17. The process of claim 14, wherein a sufficient number of the pendent esters are converted to pendent carboxylic acids, such that a % DT of the polymer is increased from an original % DT of about 0% to a final % DT of at least 1%.

18. The process of claim 17, wherein the final % DT is about 5% to about 40%.

19. The process of claim 14, wherein the step of providing the polymer in a solvent system comprises:

obtaining a product mixture resulting from biphasic synthesis of the polymer;

isolating an organic phase from the product mixture; and adding at least one solvent to the isolated organic phase to provide the solvent system.

20. A polymer composition produced by the process of claim 1.

21. The polymer composition of claim 20, wherein the polymer composition is substantially free of benzyl esters and metal catalysts.

22. The polymer composition of claim 21, wherein the polymer composition contains less than 1 wt. % of contaminants including benzyl esters and metal catalysts.

23. The polymer composition of claim 20, wherein the polymer composition comprises at least 99 wt. % of the polymer.

24. A process for selectively hydrolyzing at least one pendent ester of a polymer, said process comprising:

providing the polymer in a solvent system adapted to maintain the polymer in a dissolved or partially dissolved state such that the at least one pendent ester is hydrolyzed more readily than backbone functionalities of the polymer, wherein the polymer comprises at least one member selected from the group consisting of a polycarbonate, a polyester, a polyarylate, and a polyamide and wherein the solvent system comprises at least one solvent selected from the group consisting of 1,4-dioxane, tetrahydrofuran, dichloromethane, tert-butyl methyl ether and poly(ethylene glycol) dimethyl ether; and adding at least one acid to the solvent system to selectively hydrolyze the at least one pendent ester.

25. A process for selectively hydrolyzing at least one pendent ester of a polymer, said process comprising:

providing the polymer in a solvent system adapted to maintain the polymer in a dissolved or partially dissolved state such that the at least one pendent ester is hydrolyzed more readily than backbone functionalities of the polymer, wherein the polymer comprises at least one member selected from the group consisting of a polycarbonate, a polyester, a polyarylate, and a polyamide and wherein the solvent system comprises water and at least one ether; and adding at least one acid to the solvent system to selectively hydrolyze the at least one pendent ester.

* * * * *